Oct. 22, 1968    J. A. HELMER    3,406,799
FREE-WHEELING CLUTCH WITH GRIPPING ROLLERS
Filed June 17, 1966

INVENTOR
JOSEF A. HELMER
BY Dicke & Craig
ATTORNEYS

United States Patent Office 3,406,799
Patented Oct. 22, 1968

3,406,799
FREE-WHEELING CLUTCH WITH
GRIPPING ROLLERS
Josef A. Helmer, Aich, Kreis Nurtingen, Germany, assignor to Daimler-Benz Aktiengesellschaft, Stuttgart-Unterturkheim, Germany
Filed June 17, 1966, Ser. No. 558,423
Claims priority, application Germany, June 18, 1965,
D 47,534
7 Claims. (Cl. 192—45)

ABSTRACT OF THE DISCLOSURE

A free-wheeling clutch with cylindrical gripping rollers which are arranged between an outer ring having a cylindrical rolling and gripping surface and an inner ring, which is provided along the outer circumference with asymmetric teeth serving for the support of the gripping rollers and having involute tooth flanks and tooth roots of which one, at least partially disposed between the teeth, serves as gripping or clamping surface and whereby this inner ring is form-lockingly connected by means of entrainment teeth with a clutch part concentrically surrounding the same.

The one tooth flank or tooth root serving as gripping or clamping surface may be provided thereby, on the one hand, in its entirety with the flat configuration necessary for the gripping or clamping action of the gripping rollers or it may also consist of a corresponding flat portion serving as clamping surface and of a comparatively steep portion effective as threshold or step against a jumping-over of the gripping rollers. In both cases, however, the highly loaded tooth flanks or tooth roots are advantageously manufactured by a hob-grinding method whereby the grinding is undertaken following a hardening or quenching process of the inner ring necessary for reasons of strength.

Background of the invention

With the known free-wheeling clutches of the aforementioned type, the entrainment of the clutch part concentrically surrounding the inner ring laterally of the clamping or gripping rollers is realized by means of splines or the like manufactured in the usual manner by milling or slotting methods. Since these machining methods, however, can be undertaken only on the non-hardened workpiece, these prior art entrainment teeth are machined into the inner ring prior to the hardening process. The finish-machined entrainment teeth now suffer a strain or distortion due to hardening in the subsequent hardening process, which is effective very disadvantageously on the fitting accuracy thereof. The comparatively wide tool recess to be provided for the run-out or clearance of the work tool during the machining of the entrainment teeth represents a further disadvantage as this recess forming a non-supporting portion signifies an undesirable widening of the inner ring.

Summary of the invention

The present invention now aims at avoiding the aforementioned disadvantages and therebeyond to achieve the advantages to be described more fully hereinafter. As solution to the underlying problem, the present invention proposes that with the aforementioned free-wheeling clutches, the asymmetric teeth are constructed relatively wide compared to the width of the gripping rollers and that they serve at the same time as entrainment tooth system for the surrounding clutch part within this area extending beyond the contours of the gripping rollers.

The advantage of a very high accuracy of the entrainment teeth is achieved by this measure according to the present invention because, on the one hand, the aforementioned hardening distortion or strain occurring with the aforementioned free-wheeling clutches is eliminated and, on the other, a more accurate machining is inherently possible by means of the hob-grinding method than by milling or slotting. A further considerable advantage of the present invention resides in the manufacture in a single operation of the teeth serving for different purposes whereby the transport losses, machines, and working forces can be economized by machining in one and the same machine.

The inner portion of the clutch part engaging with the teeth of the inner ring now has to be so constructed that an entrainment thereof can take place by means of the inner teeth. Different solutions are possible as regards thereto whereby the selection of a preferred solution is completely left to the discretion of the designer.

Thus, for example, it would be feasible—with the use of an inner ring whose asymmetric teeth are provided each with a flank composed of a flat and of a steep portion—to relieve the hub of the clutch part to a diameter corresponding to the radially outermost points of the flat tooth flank or tooth root portions of the inner ring and subsequently to machine into the thus-prepared inner portion of the clutch part, recesses corresponding to the remaining contours of the asymmetric teeth for engagement therewith. However, the present invention preferably proposes that the inner portion of the clutch part in engagement with the teeth of the inner ring is provided with recesses which correspond to the complete teeth of the inner ring and which are made in conventional manner by broaching.

The manufacture of the recesses by broaching has, on the one hand, the considerable advantage of a very accurate and rapid finishing of the surfaces also of involute shape corresponding to the teeth and in contact with the teeth of the inner ring; furthermore, with corresponding dimensions of the broaching needle, large numbers of clutch parts may be machined in one and the same operation. With the use of an inner ring, whose teeth are provided with a tooth flank each composed of a flat and of a steep portion, the present invention recommends that the radial support function and/or the centering function of the clutch part with respect to the inner ring is assumed by the flat tooth-flank or tooth root and recess portions. The transfer of the circumferential forces from the inner ring to the clutch part as well as also the play-free fit of the two parts in the circumferential direction, in contradistinction thereof, is to take place, according to the present invention by the remaining flank and recess portions.

The dimensions of the asymmetric teeth of the inner ring may be selected at will in any suitable manner. For example, they may be so selected that they permit a contact of the gripping rollers among each other. However, the present invention preferably proposes that the asymmetric teeth are constructed comparatively strong or heavy so that no mutual contact can occur between the rollers. Teeth constructed so strong permit advantageously a transmission of large circumferential forces from the inner ring to the clutch part and the number of teeth can be kept relatively low.

Accordingly, it is an object of the present invention to provide a free-wheeling clutch of the type described above which eliminates by simple means and in an extraordinarily effective manner, all of the aforementioned disadvantages and shortcomings encountered with the prior art constructions.

Another object of the present invention resides in a free-wheeling clutch of the type described above which may be manufactured in a simple manner without sacrifice of accuracy in fit and thus without impairment of proper functioning.

A further object of the present invention resides in a free-wheeling clutch in which the various parts can be appropriately dimensioned according to their respective functions.

Still another object of the present invention resides in a free-wheeling clutch of the type described above in which the engaging or entrainment teeth can be constructed with great accuracy without involving complicated machining operations.

Still a further object of the present invention resides in a free-wheeling clutch which can be readily manufactured, utilizing one and the same machine for several portions to be machined, and thereby entailing considerable savings in the entire production costs.

A further object of the present invention resides in a free-wheeling clutch in which relatively large circumferential forces can be transmitted from the inner ring to the clutch part without requiring a large number of teeth.

Brief description of the drawing

These and further objects, features, and advantages of the present invention will become more obvious from the following description when taken in connection with the accompanying drawing which shows, for purposes of illustration only, one embodiment in accordance with the present invention, and wherein.

Detailed description of the drawing

Figure 1:
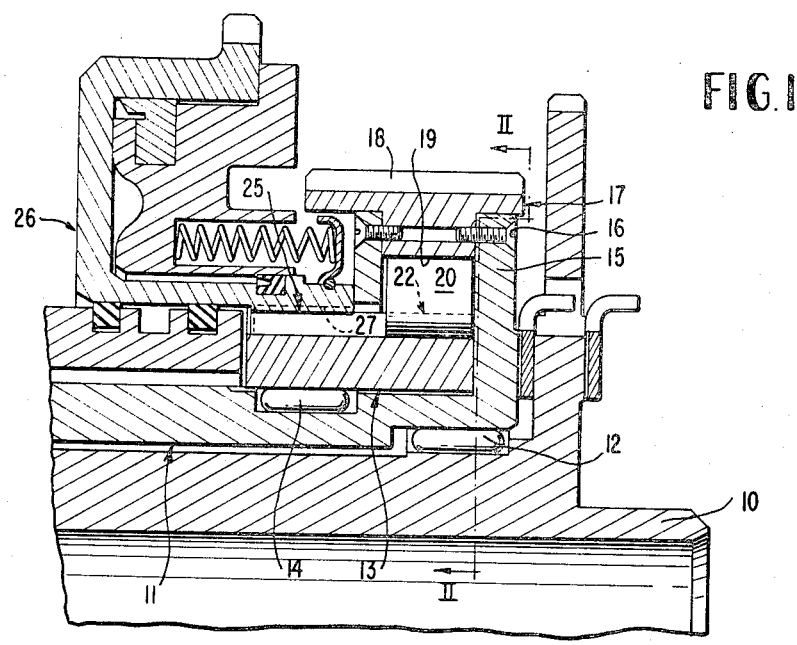
FIGURE 1 is a partial axial, longitudinal cross-sectional view through a gripping-roller free-wheeling or one-way clutch in accordance with the present invention.

Referring now to the drawing wherein like reference numerals are used throughout the two views to designate like parts, reference numeral 10 designates therein a hollow shaft on which is suitably supported by means of a needle bearing 12 an also hollow drive shaft generally designated by reference numeral 11. The inner ring generally designated by reference numeral 13 of the free-wheeling or one-way clutch is also rotatably supported on the drive shaft 11 by means of a needle bearing 14. The drive shaft 11 continues at its right end in a flange 15, on which is secured, at the outer rim thereof by means of bolts 16, the outer ring generally designated by reference numeral 17 of the free-wheeling clutch. The outer ring 17 carries along the outer circumference a toothed arrangement 18 and is provided at the inner circumference thereof with a cylindrical gripping and contact surface 19. The clamping and contact surface 19 is in engagement with cylindrical gripping rollers 20 which, on the other hand, are supported at the outer circumference of the inner ring 13 of the free-wheeling clutch serving as inner gripping surface 21 and provided with asymmetric teeth 22. The inner clamping or gripping surface 21 composed of tooth-flank or tooth-root portions of relatively flat contour as well as the tooth-flank portions 23 and 24 are constructed of involute shape (see in particular FIGURE 2) and are manufactured by the hob-grinding method.

Figure 2:
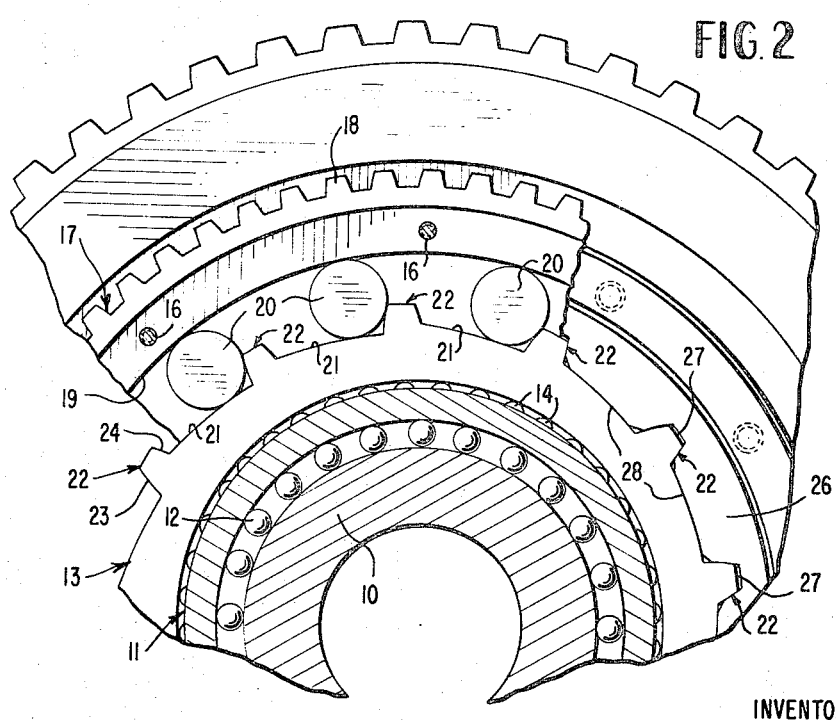
FIGURE 2 is a partial cross-sectional view, taken along line II—II of FIGURE 1.

In the position of the free-wheeling clutch illustrated in FIGURE 2, the inner ring 13 rotates in a counterclockwise direction more rapidly than the outer ring 17. Consequently, the gripping rollers 20 rest against the tooth flanks 23. If now a decelerating force acts on the inner ring 13 or an accelerating force on the outer ring 17, then the gripping rollers 20 run up on the involute clamping surfaces 21 thereof and are therefore clamped between these involute clamping surfaces 21 and the cylindrical clamping and roller surfaces 19. As a result thereof, the entrainment of the inner ring 13 by the outer ring 17 can now take place.

As is visible particularly clearly from FIGURE 1, the teeth 22 are constructed relatively wide and considerably exceed in the width dimension (axial dimension) thereof the cylindrical gripping rollers 22 in one direction. Within this area 25, in which the teeth 22 extend beyond the contours of the gripping rollers 20, the teeth 22 are in form-locking connection with a clutch part generally designated by reference numeral 26 and concentrically surrounding the inner ring 13. For this purpose, the clutch part 26 is provided at the inner circumference thereof with recesses or apertures 27 corresponding to the teeth 22, which apertures are advantageously made by broaching since this method of manufacture assures a great accuracy with simultaneous rapid operation. The surfaces 28 extending between the apertures 27 are also machined by broaching, and more particularly in the course of the same operation together with the apertures 27, and are constructed of involute shape corresponding to the partial pieces of the gripping surface 21 so that a fit of the coupling part 26 with the inner part 13 takes place in the radial direction by means of the surfaces 21 and 28 and in the circumferential direction by means of the teeth 22 and the recesses 27. A far-reaching play-free connection of the two parts 13 and 26 is achieved in this simple and appropriate manner.

While I have shown and described one embodiment in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A one-way clutch for free relative rotation in one direction about an axis, comprising: a first member mounted for rotation about the axis and having an annular surface of revolution; a second member mounted for rotation about the axis and having an annular toothed surface comprising a plurality of peripherally spaced teeth, each tooth being asymmetric in a cross-sectional plane perpendicular to the axis and having a portion radially opposite and facing said surface of revolution; a plurality of roller elements between the flanks of said teeth, and between said toothed surface and said surface of revolution; each of the tooth roots increasing in radial spacing from said surface of revolution in only one circumferential direction about the axis in said cross-sectional plane constituting cam means wedging said roller elements radially into tight locking engagement with said surface of revolution in response to movement of said second member in said one circumferential direction relative to said first member, and providing pockets for holding said roller elements out of tight locking engagement with said surface of revolution for free-wheeling between said first and second members in response to relative movement of said second member opposite to said one circumferential direction relative to said first member; said toothed surface extending axially beyond said surface of revolution in one axial direction a substantial distance to constitute an annular toothed coupling surface; a torque transmitting third member having a toothed coupling surface with a plurality of teeth interengaging radially with said teeth of said second member to constitute constantly engaged means for transmitting torque between said second member and said third member.

2. A free-wheeling clutch according to claim 1, wherein said roller elements are cylindrical rollers, said surface of revolution being cylindrical.

3. A free-wheeling clutch according to claim 2, wherein said toothed surface of said second member consists of surfaces axially extending parallel to the axis.

4. A free-wheeling clutch according to claim 3, wherein the tooth flanks of each tooth for said second member are of involute shape and spaced from each other a distance sufficient to prevent peripheral contact between said roller elements.

5. A free-wheeling clutch according to claim 1, wherein said toothed surface of said second member consist of surfaces axially extending parallel to the axis.

6. A free-wheeling clutch according to claim 5, wherein the tooth flanks of each tooth for said second member are of involute shape and spaced from each other a distance sufficient to prevent peripheral contact between said roller elements.

7. A free-wheel clutch according to claim 1, wherein said toothed surface consists of said teeth; roller bearing means between said first and second members; said second member being radially inward with respect to said first and third members.

References Cited

UNITED STATES PATENTS 2,707,540  5/1955  Morris _____ 192—44 XR

BENJAMIN W. WYCHE III, *Primary Examiner.*

L. J. PAYNE, *Assistant Examiner.*